United States Patent [19]

Honda

[11] Patent Number: 4,884,823
[45] Date of Patent: Dec. 5, 1989

[54] STEERING WHEEL ASSEMBLY WITH AIR BAG

[75] Inventor: Kiyoshi Honda, Saitama, Japan

[73] Assignee: Honda Giken Kogyo Kabushiki Kaisha, Tokyo, Japan

[21] Appl. No.: 20,610

[22] Filed: Mar. 2, 1987

[30] Foreign Application Priority Data

Feb. 28, 1986 [JP] Japan .................................. 61-44762
Feb. 28, 1986 [JP] Japan .................................. 61-44768

[51] Int. Cl.$^4$ .............................................. B60R 21/22
[52] U.S. Cl. ...................................... 280/731; 74/552
[58] Field of Search ...................... 280/731, 743, 750; 74/552; D12/175, 176

[56] References Cited

U.S. PATENT DOCUMENTS 3,507,165  4/1970  Wilfert ................................ 74/552
4,101,146  7/1978  Oehm ................................ 280/731

Primary Examiner—Charles A. Marmor
Assistant Examiner—Karin Tyson
Attorney, Agent, or Firm—Lyon & Lyon

[57] ABSTRACT

A steering wheel assembly has a steering shaft, a wheel ring, a support supporting the wheel ring on the steering shaft, and an air bag device supported on the support means radially inwardly of the wheel ring. The wheel ring has an upper half and a lower half which are positioned above and below, respectively, a transverse line passing through the steering shaft when the steering wheel is in a neutral position thereof. The support has a first support member supporting the upper half of the wheel ring and a second support member supporting the lower half of the wheel ring, the first support member having a greater rigidity than that of the second support member.

7 Claims, 1 Drawing Sheet

STEERING WHEEL ASSEMBLY WITH AIR BAG

BACKGROUND OF THE INVENTION

1. Field of the Invention

The present invention relates to a steering wheel for use in a motor vehicle such as an automobile, and more particularly to a steering wheel assembly having a safety air bag.

2. Description of the Relevant Art

Various vehicle safety devices are known for protecting the driver of an automobile from impact in the event of an accident. One such vehicle safety device employs an inflatable air bag stored in the steering wheel radially inwardly of the wheel ring, as disclosed in U.S. Pat. No. 3,819,205 issued to Dunford et al, for example. When the air bag is operated, a large load due to a large inertial force imposed by the driver is applied via the inflated air bag intensively to the wheel ring, particularly its upper portion, which is inclined to the vertical plane at an acute angle. Conventional steering wheel assemblies with such safety air bags are disadvantageous in that a support member supporting the wheel ring tends to be deflected or bent forwardly under the applied large load, causing the lower portion of the wheel ring to be moved toward the driver. When the steering wheel assembly is thus deformed, the inflated air bag is displaced relatively upwardly, thereby failing to provide a sufficient cushioning effect between the lower portion of the wheel ring and the body of the driver.

The present invention has been accomplished in view of the aforesaid drawback of the conventional vehicle safety devices.

SUMMARY OF THE INVENTION

According to the present invention, there is provided a steering wheel assembly comprising a steering shaft, a wheel ring, support means supporting the wheel ring on the steering shaft, and an air bag device supported on the support means radially inwardly of the wheel ring, the wheel ring having an upper half and a lower half which are positioned above and below, respectively, a transverse line passing through the steering shaft when the steering wheel is in a neutral position thereof, the support means having first support means supporting the upper half of the wheel ring and second support means supporting the lower half of the wheel ring, the first support means having a greater rigidity than that of the second support means.

With the present invention, the wheel ring is prevented from being deflected or turned forwardly even if a large load is imposed on the steering wheel assembly when the air bag is inflated on impact, so that a sufficient cushioning effect can be assured by the air bag for the protection of a vehicle driver.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
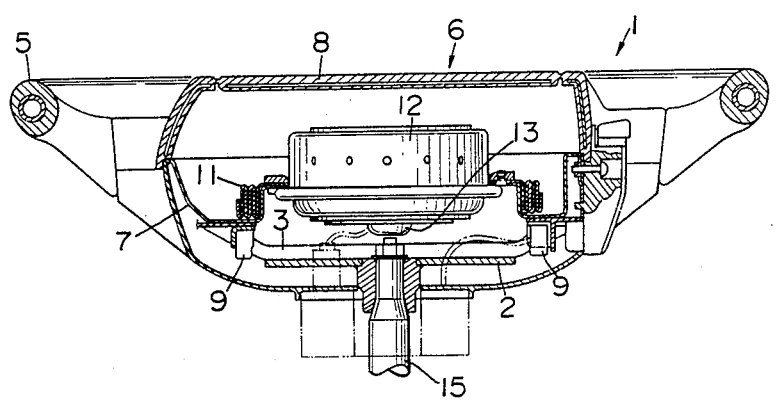
FIG. 1 is a cross-sectional view of a steering wheel assembly incorporating an air bag according to the present invention.
Figure 2:
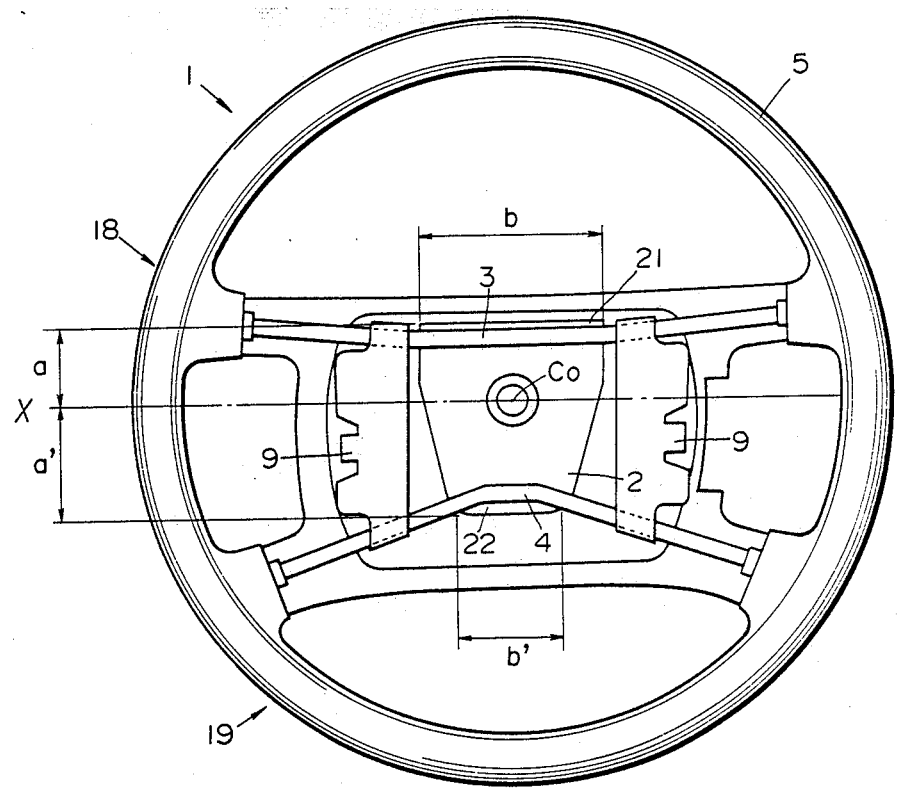
FIG. 2 is a plan view of the steering wheel assembly of FIG. 1, with the air bag removed.

As shown in FIGS. 1 and 2, a steering wheel assembly 1 of a motor vehicle such as an automobile comprises a wheel hub 2 fixed to the upper end of a steering shaft 15, two upper and lower spokes 3, 4 fixed to an upper or forward portion and a lower or rearward portion, respectively, of the wheel hub 2 and extending laterally when the steering wheel assembly is in its neutral position, and a wheel ring 5 secured to the lateral ends of the spokes 3, 4 and supported by the spokes 3, 4. The wheel ring 5 is spaced from the wheel hub 2 axially of the steering shaft 15 by the spokes 3, 4.

An air bag casing 6 is disposed substantially centrally in the steering wheel assembly 1. The air bag casing 6 comprises a lower case 7 and an upper case 8 (FIG. 1). The upper case 8 is joined to and positioned over the lower case 7 which is supported by brackets 9 on the spokes 3, 4. The air bag casing 6 houses therein an inflatable air bag 11 and a gas generator 12.

The gas generator 12 is of a circular shape when viewed in plan and has a fuse 13 projecting centrally from the lower surface thereof. The air bag 11 is secured around the gas generator 12. The gas generator 12 is supported on the brackets 9 positioned between the upper and lower spokes 3, 4 and one on each side of the wheel hub 2. The air bag 11 is accommodated in the air bag casing 6 in a collapsed condition.

If the vehicle collides with another vehicle or a hard object, the fuse 13 is ignited to cause the gas generator 12 to eject a gas, inflating the air bag 11 which opens the upper cover 8. The air bag 11 as it progressively inflates is expanded out of the air bag casing 6 over the steering wheel assembly 1.

While the steering wheel assembly 1 is in its neutral position, as shown in FIG. 2, the distance a between the center Co of the steering shaft 15 and an upper end 21 of the wheel hub 2 is selected to be smaller than the distance a' between the center Co of the steering shaft 15 and a lower end 22 of the wheel hub 2 (a<a'), and a central portion of the upper spoke 3 is welded or otherwise secured to the upper end 21 of the wheel hub 2 whereas a central portion of the lower spoke 4 is welded or otherwise secured to the lower end 22 of the wheel hub 2.

With the above configuration, if the same load is applied to the upper and lower ends 21, 22 of the wheel hub 2, the bending moment acting on the upper end 21 with the steering shaft center Co as the supported end is smaller than the bending moment acting on the lower end 22. Therefore, the upper end 21 of the wheel hub 2 can bear a greater load than the lower end 22 thereof can. Thus, an upper half 18 of the steering wheel assembly 1 or the wheel ring 5 is of a higher bearing rigidity than a lower half 19 thereof. The terms "upper half 18" and "lower half 19" used herein denote the upper and lower halves, respectively, of the wheel ring 5 above and below a horizontal diametrical line X passing through the center Co, when the wheel ring 5 is in the neutral position.

The wheel hub upper end 21 to which the upper spoke 3 is fixed has a width b larger than a width b' of the wheel hub lower end 22 to which the lower spoke 4 is fixed (b>b'). Consequently, the section modulus which represents the rigidity of the wheel hub 2 is larger at the upper end 21 than at the lower end 22. This structure is also effective to make the bearing rigidity of the upper half 18 of the steering wheel assembly 1 larger than that of the lower half 19 thereof. With this arrangement, the desired advantages of the invention, i.e., the stronger bearing rigidity at the upper half 18 than at the lower half 19, can be achieved even if the distances a, a' from the steering shaft center Co to the upper and lower ends 21, 22 of the wheel hub 2 remain substantially the same.

Since the upper end 21 of the wheel hub 2 is wider than the lower end 22 thereof, the length of portions of the upper spoke 3 from the wheel ring 5 to the wheel hub upper end 21 is smaller than the length of portions of the lower spoke 4 from the wheel ring 5 to the wheel hub lower end 22. Thus, the upper spoke 3 has a higher rigidity than that of the lower spoke 4. The rigidity of the upper spoke 3 may be made larger than that of the lower spoke 4 such as simply by increasing the diameter of the upper spoke 3 in excess of the diameter of the lower spoke 4, while the rigidity of the wheel hub 2 itself may remain constant between the upper and lower ends 21, 22 thereof.

The hub 2 and spokes 3 and 4 provide a support means for supporting the wheel ring 5 from the steering shaft with the wheel hub upper end 21 and upper spoke 3 forming a first support means for the upper half 18 of the steering wheel 5 and the wheel hub lower end 22 and lower spoke 4 forming a less rigid second support means for the lower half 19 of the steering wheel 5 in the above-described embodiment, as shown in the drawings.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A steering wheel assembly comprising:
    a steering shaft;
    a wheel ring;
    support means supporting said wheel ring on said steering shaft;
    an air bag device supported on said support means radially inwardly of said wheel ring;
    said wheel ring having an upper half and a lower half which are positioned above and below, respectively, a transverse line passing through said steering shaft when said steering wheel is in a neutral position thereof; and
    said support means having first support means supporting said upper half of said wheel ring and second support means supporting said lower half of said wheel ring, said first support means having a greater rigidity than that of said second support means.

2. A steering wheel assembly according to claim 1, wherein said support means comprises a wheel hub fixed to said steering shaft, and connecting means interconnecting said wheel hub and said wheel ring;
    said wheel hub including an upper portion and a lower portion positioned above and below, respectively, said transverse line;
    said connecting means including an upper connecting member interconnecting said upper portion of the wheel hub and said upper half of said wheel ring, and a lower connecting member interconnecting said lower portion of the wheel hub and said lower half of said wheel ring; and
    said first support means comprising said upper portion of the wheel hub and said upper connecting member, said second support means comprising said lower portion of the wheel hub and said lower connecting member.

3. A steering wheel assembly according to claim 2, wherein said upper portion of the wheel hub has a greater rigidity than that of said lower portion of the wheel hub.

4. A steering wheel assembly according to claim 3, wherein said upper portion of the wheel hub has a greater width than that of said lower portion of the wheel hub.

5. A steering wheel assembly according to claim 3, wherein said upper connecting member is coupled to an upper end of said upper portion of the wheel hub, and said lower connecting member is coupled to a lower end of said lower portion of the wheel hub, and wherein the distance between said upper end of said upper portion of the wheel hub and said steering shaft is smaller than the distance between said lower end of said lower portion of the wheel hub and said steering shaft.

6. A steering wheel assembly according to claim 2, wherein said upper connecting member has a greater rigidity than that of said lower connecting member.

7. A steering wheel assembly according to claim 6, wherein the length of said upper connecting member from said upper half of the wheel ring to said upper portion of the wheel hub is smaller than the length of said lower connecting member from said lower half of the wheel ring to said lower portion of the wheel hub.

* * * * *